United States Patent [11] 3,609,589

| [72] | Inventor | Robert E. Hufnagel |
| | | Ridgefield, Conn. |
| [21] | Appl. No. | 756,855 |
| [22] | Filed | Sept. 3, 1968 |
| [45] | Patented | Sept. 28, 1971 |
| [73] | Assignee | The Perkin-Elmer Corporation |
| | | Norwalk, Conn. |

[54] MIRROR FOR RESISTING THERMALLY INDUCED WARP
9 Claims, 5 Drawing Figs.

| [52] | U.S. Cl. | 331/94.5, 350/310 |
| [51] | Int. Cl. | H01s 3/04 |
| [50] | Field of Search | 331/94.5; 350/310 |

[56] References Cited
UNITED STATES PATENTS

| 1,890,166 | 12/1932 | Shatto et al. | 350/310 |
| 2,294,940 | 9/1942 | Skolnik | 350/310 |

OTHER REFERENCES

Stickley, " Journal of Quantum Electronics," VQEZ, N4, p. XLVI.

Primary Examiner—Roy Lake
Assistant Examiner—Darwin R. Hostetter
Attorney—Edward R. Hyde, Jr.

ABSTRACT: A mirror for use in conditions which produce a severe thermal gradient including a first layer having a reflecting surface of selected configuration and one or more additional layers bonded to the back of the first layer. The various layers are selected to have thicknesses and coefficients of thermal expansion such that the tendency of the mirror to warp due to the thermal gradient is opposed by, and preferably balanced by, the tendency to curve caused by differential expansion of said layers so that the selected configuration is retained over a range of gradients.

PATENTED SEP 28 1971
3,609,589
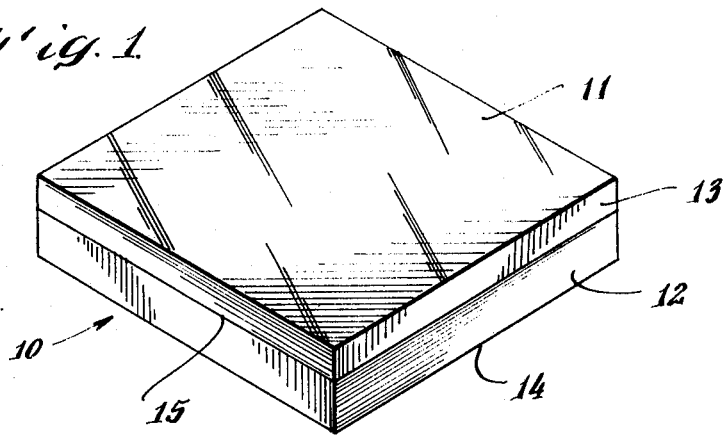
Fig. 1.
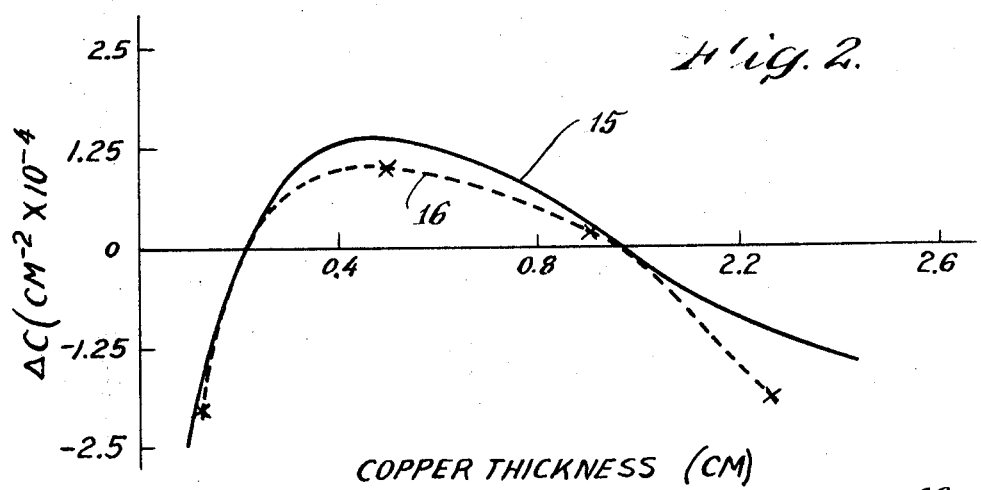
Fig. 2.
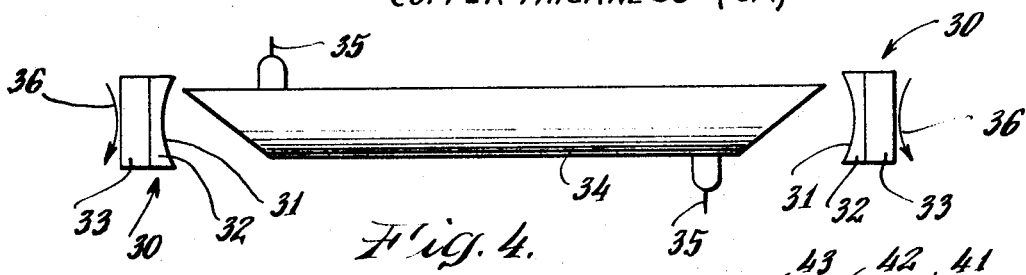
Fig. 4.
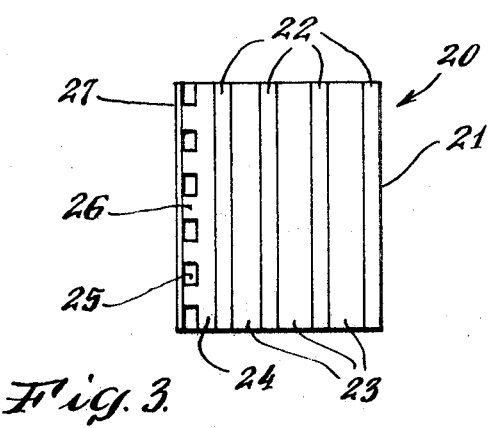
Fig. 3.
Fig. 5.
INVENTOR.
Robert E. Hufnagel
BY
Edward D. Murphy
ATTORNEY.

MIRROR FOR RESISTING THERMALLY INDUCED WARP

This invention is directed to a novel construction for mirrors which is adapted to resist the thermally induced curvature which can occur in conventional mirrors.

Mirrors used in environments which produce severe thermal gradients along the mirror axis are subject to warp when the differing temperatures at the front and back surfaces produce an excessive difference in the amount of expansion of the material. Even when materials of relatively good thermal conductivity such as metals are used, warp is a problem in a variety of applications including, for example, solar energy collectors in space, optical cavities for high power lasers, and observation devices for monitoring conditions within furnaces. It is the purpose of this invention to provide mirrors which are not subject to warp under such conditions.

It is accordingly an object of this invention to provide a new and improved mirror in which the effect of unequal thermal loading is reduced.

Another object of this invention is the provision of a new and improved mirror in which warp due to thermal gradients is lessened.

A further object of this invention is the provision of a new and improved mirror which retains its optical configuration while subjected to an axial thermal gradient.

Further objects and advantages of this invention will become apparent as the description and illustration thereof proceed.

Briefly, in accord with one embodiment of this invention, I provide a mirror for use in conditions which produce a severe axial thermal gradient and which is adapted to retain its surface configuration when subjected to the gradient. The mirror includes a first layer having a reflective surface of the selected configuration and at least one second layer bonded to the back surface of the first layer. In accord with this invention, the thicknesses and the coefficients of thermal expansion of the layers are selected so that the change in curvature produced by differential expansion of the layers at their interfaces is opposed to and preferably balances the change in curvature due to warp produced by the existence of a thermal gradient across the mirror.

In the accompanying drawings,

FIG. 1 is a perspective view, partially broken away, of a basic embodiment of this invention;

FIG. 2 is a graph representing the curvature of different mirrors subjected to a thermal gradient;

FIG. 3 is a vertical cross-sectional view of an alternative embodiment of this invention;

FIG. 4 is a schematic view of a system including a mirror in accord with this invention; and FIG. 5 is a vertical cross section of an alternative embodiment of this invention.

In FIG. 1 the basic elements of this invention are illustrated in an embodiment which comprises a mirror 10 having a reflective surface 11 and made up of two layers 12 and 13 of different materials. In use, this mirror is located in an environment which subjects the front surface 11 to a substantially higher temperature than that at the back surface 14. In general, these temperature extremes can be due either to the existence of high and low temperature ambient conditions on the opposite sides of the mirror or to the application of a specific heat source to the front surface of the mirror and the application of a cooling medium to the back surface.

The basic concept of this invention is that the layers 12 and 13 have coefficients of thermal expansion so related that the tendency to curve at their interface 15 due to differential expansion of the layers opposes and preferably overcomes the curvature which is caused by the axial thermal gradient across the mirror. Specifically, the existence of a sufficient temperature differential across any body produces a thermal gradient within the body and, if the gradient is sufficient, even materials of high thermal conductivity are subject to bending since the high temperature at one surface causes more expansion than the lower temperature at the other surface. For convenience, in the remainder of this specification, the bending or change in curvature which occurs due to a thermal gradient across a body is referred to as "warping" to distinguish it from the change of curvature which results from the different amounts of expansion of two materials of different coefficients of expansion which are thermally and mechanically connected at an interface and are at the same temperature. The latter case is referred to hereinafter as "differential expansion."

The warp curvature which occurs in a single layer is, for most materials, in a direction which causes a planar surface to become convex toward the high temperature side. When two different materials are joined together as in FIG. 1 and the body is subjected to a similar gradient, the warp forces tend to bend it so as to make the front surface 11 convex and the back surface 14 concave. In accord with the present invention, this effect is compensated by making the back layer 12 of a material which has a substantially higher coefficient of expansion than the material of the front layer 13. Accordingly, the back layer 12 is subject to a greater expansion force and, due to the interface connection, this tends to cause a tendency to curve which opposes the warp tendency. Preferably, the body is designed so that the net curvature change is zero. As a specific example, a mirror wherein the front layer 13 was tungsten and the back layer 12 was copper was found to exhibit substantially less curvature in the warp direction than that encountered in a similar mirror constructed of a single material. In fact, by adjusting the relative thicknesses of the two layers, it was possible to maintain the front surface 11 in a planar configuration or to produce concave curvature thereof. These tests were conducted with a thermal gradient on the order of several hundred degrees C. across a thickness of about 2 centimeters.

In order to select the exact materials which should be used and their relative thicknesses, it is necessary to know the parameters of the situation in which the mirror is to be used. For example, other factors such as electrical conductivity, reflectivity, etc., may impose limiting requirements on the range of choices available for either or both of the layers of the mirror. The gradient or range of gradients to which the mirror is to be subjected should be determined as accurately as possible; the materials are then selected from those which meet the above requirements by choosing those which best satisfy the equation below when the curvature of the reflective surface is within the required limits or, in the preferred embodiment, is zero. For convenience, curvature is defined as $c=1/R$ where $R$ is the radius of curvature of the front surface of the mirror (the reciprocal is used as it is more convenient to deal with "0" as the unwarped case than with "∞"):

$$c = Q \frac{\left\{ 6(\alpha_1 - \alpha_2)\left[\frac{a_1}{\kappa_1} + \frac{a_2}{\kappa_2}\right] - \frac{1}{a_1 + a_2}\left[\frac{1-\nu_1}{a_1 E_1} + \frac{1-\nu_2}{a_2 E_2}\right]\left[\frac{\alpha_1 E_1 a_1^3}{(1-\nu_1)\kappa_1} + \frac{\alpha_2 E_2 a_2^3}{(1-\nu_2)\kappa_2}\right] \right\}}{3(a_1 + a_2) + \frac{1}{a_1 + a_2}\left[\frac{1-\nu_1}{a_1 E_1} + \frac{1-\nu_2}{a_2 E_2}\right]\left[\frac{a_1^3 E_1}{1-\nu_1} + \frac{a_2^3 E_2}{1-\nu_2}\right]}$$

where the subscripts 1 and 2 refer to the colder and hotter layers respectively (that is, the back layer 13 and the front layer 12), and where $Q$ is the heat flow through the mirror per unit area $E$ is Young's modulus $\alpha$ is the thermal expansion coefficient $a$ is the thickness of the layer $\nu$ is the thermal conductivity, and $\kappa$ is Poisson's ratio.

This equation assumes that the front surface 11 is planar before heating; a positive value of $c$ indicates a curvature convex toward the heat source, while a negative value indicates a concave curvature. If the reflective surface 11 has some other initial configuration such as a concave spherical curvature, a similar equation can be derived which defines the conditions for which the change in curvature is zero. More specifically, the change in curvature of a given body, defined as follows:

$$\delta C = 1/R_{Heated} - 1/R_{Cold},$$

is produced by the sum of the external and internal forces acting on it. In a multilayer mirror, each layer $i$ experiences an internal warping force due to the thermal gradient across it which is $$\delta C_{i_T} = \alpha_i \frac{dT}{dx}\bigg)_i$$

Each layer also experiences external forces produced by the different expansion of the other layers to which it is mechanically attached. The effect of these forces may be stated in the form $$\delta C_{i_M} = \beta_i \sum_j F_{ij}$$

where $\beta_i$ is a factor which includes the dimensions of the body, Young's Modulus, etc., and may generally be characterized as the "coefficient of bending compliance" of the layer. $F_{ij}$ represents the mechanical forces applied to the layer $i$ by each of the other layers of the mirror. Thus, the total change in curvature of the element $i$ is given by:

$$\delta C_i = \delta C_{i_M} + \delta C_{i_T}$$

Since the layers are joined together by fusing or other suitable means, the change in curvature for all of the layers is essentially the same and, in accord with this invention, this change in curvature is maintained at 0. In other words, for each layer it:

$$\delta C_i = \beta_i \sum_j F_{ij} + \alpha_i \frac{dT}{dx}\bigg)_i = 0$$

In order to achieve this condition, the mechanical and thermal gradient curvatures must be balanced. Equality between the mechanical forces $F_{ij}$ and the thermal force $$\frac{dT}{dx}\bigg)_i$$

is obtained by providing a heat sink at the temperature at which $R_{Cold}$ is measured adjacent the back surface and maintaining a steady state thermal gradient across the body. The selection of appropriate materials is then made to achieve the required balance between the factors $\alpha$ and $\beta$. This selection involves the factors of mechanical rigidity, thermal expansion and dimensions of each layer and one equation in the above form for each layer.

It is noted that the curvature change in any situation need only be as close to zero as is required by the optical use of the mirror. For example, the accuracy of configuration required in a laser cavity or in an observation mirror will usually be substantially higher than that required in a solar energy collector. Accordingly, it is only necessary that the curvature change be as close to zero as required by the application.

The graph shown in FIG. 2 illustrates the results obtained in a series of tests on a particular embodiment of this invention and compares these results with the theoretical prediction. The graph represents the variation in surface curvature $c$ as the proportion of copper in a copper-tungsten body is changed. The solid line 15 is the curve predicted by the equation given above while the dotted line 16 is the curve plotted from experimentally determined points. These points are indicated on curve 16 by the notation "*x*."

The curve 15 was obtained by setting the necessary quantities at the values for a body 0.8 cm. in diameter and having an 0.625 cm. thick front layer of tungsten and a back layer of copper. The heat flux was selected to be 150 cal./sec./sq.cm. and the equation then reduces to a statement of the relation between the curvature, $c$, and the thickness of the copper layer. Curve 15 was generated from this equation.

Curve 16 was obtained by preparing a body in accord with these conditions and having a 1.25 cm. thick copper plate bonded to the back of the tungsten plate. Bonding was performed by passing a current of about 250 amps through the two plates. The front surface was heated to 250° and the back surface was maintained at 14° C. by a flowing water bath, thus representing a steady state heat flow of 150 calories per second per unit area. The effective copper thickness, which corresponds to the quantity $a_1$ in the equation, was varied by directing the water over sections of varying thickness at the back surface. The effective copper thickness over which the temperature gradient occurred is then equal to 1.25 cm. minus the thickness over which the water was passed. The curvature of the front surface of the tungsten was measured for various copper thicknesses by comparison of interferograms.

The curves of FIG. 2 show that the variation in copper thickness produced a substantial change in curvature within the plotted range, and shows excellent agreement between the theoretical and experimental results. In both cases, as the thickness increased, the curvature passed from a region A of negative curvature (concave toward the heat source) through a region B of positive curvature (convex) and back to a region C of negative curvature. Thus, at two different ratios, the curvature resulting from the combination of warp forces and bilayer forces is zero and the front surface remains flat. Either of these two ratios may be selected as the one to be used; generally, the ratio permitting a thinner front layer is chosen as this produces more rapid heating of the interface and reduces transient effects.

For comparison purposes, it is noted that the warp which is encountered in a single layer of tungsten of the same thickness as the bilayer unit is about $7.5 \times 10^{14} cm^{11}$ which is a much more severe case than any of those measured.

FIG. 3 illustrates an alternative and preferred embodiment of this invention which is advantageous in several respects. In FIG. 3, the mirror 20 comprises a front reflective surface 21 and a plurality of layers of tungsten 22 alternated with a plurality of layers 23 of copper. This embodiment is more useful because it reduces the possible distorting effects of transients which may exist in actual use. In particular, transients cause nonlinearity of the temperature profile along the axis of the mirror. When multiple alternated layers are used, so arranged that each pair including a back layer 23 and a front layer 22 satisfies the previously stated equation, the temperature profile across each interface within each pair is more nearly linear and the effect of transient conditions is therefore reduced.

In FIG. 3, the last back layer 24 is arranged to allow a preferred cooling system to be employed. A plurality of channels 25 separated by ridges 26 and covered by a plate 27 are provided through which a flow of any suitable cooling medium may be established.

The present invention is of particular importance in the case of metal mirrors. Accordingly, while mirrors fabricated from other materials may be constructed in accord with the concept of this invention, a preferred embodiment is one wherein the multiple layers are selected from the metallic elements or alloys such as the use of a copper and tungsten mirror previously mentioned. This embodiment is of particular importance in the case of recently developed high power lasers which, by utilizing certain materials such as carbon dioxide, can achieve power outputs on the order of several hundred watts or more. In these lasers the internal radiation which must be reflected by the mirrors of the resonant cavity may be up to one hundred times greater than the output. Although the reflective surface of the mirror limits the amount of this heat which is absorbed by the mirror, substantial heat flux into the body of the mirror does occur. In this situation, therefore, it is necessary that a high temperature material such as a refractory metal be used and means for removing the heat must be provided. Thus, the heat passes through the mirror and is removed rapidly from the back surface; therefore, a severe axial gradient is established. Since the existence of a severe gradient causes warp, the tendency for this condition to occur is enhanced and it is particularly necessary to provide means for preventing it. The concept of the present invention has been found to be particularly effective in this regard.

FIG. 4 illustrates the application of the concept of this invention in a high power gas laser. In this system, a pair of mirrors 30 having reflective front surfaces 31 and each including at least two layers, 32 and 33, are provided as the mirrors defining the resonant cavity for a high power laser. The gas-enclosing region of the laser is schematically illustrated by the enclosure 34, and the driving energy is supplied by means such as electrodes 35 connected to a power supply, not shown. As previously mentioned, the mirrors 30 which define the resonant cavity must be capable of withstanding extremely high levels of applied power. Although the reflective nature of the surface limits the heat actually absorbed by the mirror, it is clear that the application of many kilowatts of energy will cause a substantial heat input to the mirror. In order to protect the mirror at these power levels, it is necessary to remove the heat as rapidly as possible; accordingly, some cooling medium as represented by the arrow 36 is applied to the back surfaces of the mirrors 30. Necessarily, this condition of high power input at the reflective surface and the application of a coolant to the back surface produces a sharp gradient across the mirror. In fact, it is not possible to reduce the severity of the effect of this gradient because a thick mirror is difficult to cool and experiences a very high temperature at the front surface and thus would be subject to severe warping curvature, while a thin mirror, even though it is cooled more rapidly and kept at a lower temperature at the front surface, is subject to a steeper gradient.

Accordingly, the mirrors 30 are constructed in accord with the multilayer concept of this invention. The relative thickness of the layers 32 and 33 and the coefficients of expansion thereof are chosen so that the net change in curvature produced by the gradients encountered in a given laser is zero. It is particularly noted that, in the case of a laser, it is necessary that a warped configuration be avoided during startup cycle since such a configuration could fail to return the internal radiation of the laser along the optical axis of the resonant cavity and the laser would shut itself off. The multilayer configuration of FIG. 3 is particularly useful in this situation. The multiple interfaces are effective to overcome temporary warping effects due to transient conditions which may be produced during rapid heating.

It is also noted that some means must be provided for extracting a percentage of the internal power of the laser in order to produce a useful output. This may be done by any simple means such as the conventional mechanism of providing an aperture (not shown) through one of the mirrors 30 at a region of high energy concentration. In the mirrors shown in FIG. 4, this aperture must, of course, extend through all of the layers of which the mirror is composed and also through the cooling system at the back surface of the mirror.

Conventional mirrors frequently make use of one or more coatings on the front surface of the mirror to enhance reflectivity or for other purposes. While the power levels encountered in situations with which the present invention is concerned will usually be too high, it is noted that thin coatings of materials such as gold which are not subject to dissipation at these heat levels may be used if desired. In general, such coatings are sufficiently thin, for example on the order of one or two wavelengths, so that they do not exert a significant influence on the curvature of the reflective surface. If the coating used is of significant thickness, however, this factor may be included in the equation derived for determining the thickness and coefficient of expansion of the layers used behind the front layer.

Another aspect of this invention is the possibility that more than two materials might be provided as distinct curvature-controlling layers in a mirror in accord with this invention. That is, a combination such as tungsten, copper and nickel in layers of appropriate thickness might be found to be the optimum combination for a given situation. FIG. 5 illustrates such a situation wherein the mirror 40 is composed of a front layer 41, a second layer 42 and a third layer 43. The front layer 41 includes a reflective surface 44 of desired configuration. In this case a more complex equation in the nature of that stated previously must be derived which relates the effect of the two different interfaces 45 and 46 on the net curvature of the mirror 40.

While I have illustrated and described a particular embodiment of my invention, it will be understood that various modifications may be made therein without departing from the spirit of the invention and the scope of the appended claims.

I claim:

1. Apparatus for producing a coherent beam of high-power radiation which comprises:
   reflective means defining a resonant cavity and including a reflective surface;
   a material within said cavity capable of exhibiting laser action;
   means for supplying energy to said material;
   means for cooling a portion of said reflective means spaced from said reflective surface with the consequent establishment of a thermal gradient therebetween; and
   means intermediate said reflective surface and said cooled portion for compensating warp produced by said thermal gradient.

2. In apparatus for producing a coherent beam of high-power radiation which includes reflective means having a reflective surface defining a resonant cavity, a material within said cavity capable of exhibiting laser action, means for supplying energy to said material, and means for cooling a portion of said reflective means spaced from said reflective surface for establishing a thermal gradient across the reflective means, the improvement comprising provision of means for maintaining the initial configuration of said reflective means, said means comprising a plurality of layers included in said reflective means, said layers being generally parallel to the reflective surface and being bonded together, the coefficients of thermal expansion of said layers being different and being selected so that the curvature produced by differential expansion of said layers at their interfaces opposes the curvature produced by the existence of a thermal gradient across each of said layers.

3. Apparatus as claimed in claim 2 wherein said plurality of layers includes at least one additional layer having a coefficient of thermal expansion equal to that of said first layer, and at least one additional layer having a coefficient of thermal expansion equal to that of said second layer; said additional layers being alternated behind said first and second layers to stabilize said configuration during transient fluctuations in said gradient.

4. The apparatus claimed in claim 2 wherein said reflective means includes a first layer having a reflective front surface of selected initial configuration, and at least one second layer bonded to said first layer.

5. The apparatus claimed in claim 4 wherein the coefficient of expansion of said second layer is greater than that of said first layer.

6. The apparatus claimed in claim 4, wherein said improvement further comprises selecting said coefficients so that the net curvature-producing force is substantially zero over the range of thermal gradients to which the reflective means is subjected by said laser means and said cooling means.

7. The apparatus claimed in claim 4 wherein said improvement further includes a third layer bonded to said second layer.

8. The apparatus claimed in claim 4 wherein said plurality of layers includes additional pairs of layers respectively similar to said first and said second layers.

9. The apparatus claimed in claim 4 wherein said improvement further comprises selecting said layers from the group consisting of metals and metal alloys.